(12) United States Patent
Morey

(10) Patent No.: US 6,641,054 B2
(45) Date of Patent: Nov. 4, 2003

(54) PROJECTION DISPLAY THERMOSTAT

(76) Inventor: Randall L. Morey, 154 Kimberly Rd., East Granby, CT (US) 06026

( * ) Notice: Subject to any disclaimer, the term of this patent is extended or adjusted under 35 U.S.C. 154(b) by 0 days.

(21) Appl. No.: 10/053,263

(22) Filed: Jan. 23, 2002

(65) Prior Publication Data

US 2003/0136853 A1 Jul. 24, 2003

(51) Int. Cl.[7] .......................... G09G 5/00; G05D 23/00
(52) U.S. Cl. .................................. 236/94; 345/168
(58) Field of Search ........................... 236/94, 46 R; 165/11.1; 345/168

(56) References Cited

U.S. PATENT DOCUMENTS

2001/0037166 A1 * 11/2001 Block .......................... 701/14
2002/0140633 A1 * 10/2002 Rafii et al. ..................... 345/8

* cited by examiner

*Primary Examiner*—William Wayner
(74) *Attorney, Agent, or Firm*—William F. White

(57) ABSTRACT

A thermostat is provided with an image projection capability that allows images concerning the operation of the thermostat to be projected onto a surface in the vicinity of the thermostat. The image projection is preferably accomplished by directing an internally generated image to an image enlargement device which thereafter projects an enlarged image onto the surface in the vicinity of the thermostat. The surface that receives the projected image is preferably defined by a screen affixed to the wall that the thermostat is mounted to.

21 Claims, 3 Drawing Sheets

PROJECTION DISPLAY THERMOSTAT

BACKGROUND OF THE INVENTION

This invention relates to programmable thermostats and in particular to the display capabilities of such thermostats.

Programmable thermostats have heretofore included alphanumeric displays located within the thermostat. These displays are typically located on the front of the thermostat so as to be viewable by a person making selections as to set point temperatures that are to occur at various times of the day or night. The size of these displays is constrained by virtue of the limited space available for such displays on the front panel of the thermostat. As a result, the displays are relatively small resulting in only limited information being displayed. There is no room for on-screen instructions as to how to program the thermostat.

What is needed is a thermostat with a capability to legibly display more information than is permitted on the front face of the thermostat.

SUMMARY OF THE INVENTION

A thermostat is provided with an image projection capability that allows images concerning the operation of the thermostat to be projected onto a surface in the vicinity of the thermostat. The image projection is preferably accomplished by directing an internally generated image to an image enlargement device which thereafter projects an enlarged image onto the surface in the vicinity of the thermostat. The image is preferably generated by a microprocessor and displayed on an internal image forming device located within the body of the thermostat. One or more mirrors or prisms located within the body of the thermostat transfer the image to the image enlargement device which is preferably a convex mirror. The enlargement device is preferably mounted within a housing located on a top front portion of the thermostat so as to maximize the projection length onto the surface in the vicinity of the thermostat. The surface that receives the projected image is preferably defined by a screen affixed to the wall that the thermostat is mounted to.

BRIEF DESCRIPTION OF THE DRAWINGS

The invention will become more apparent by reading a detailed description thereof in conjunction with the following drawings in which.

DESCRIPTION OF THE PREFERRED EMBODIMENT

Figure 1:
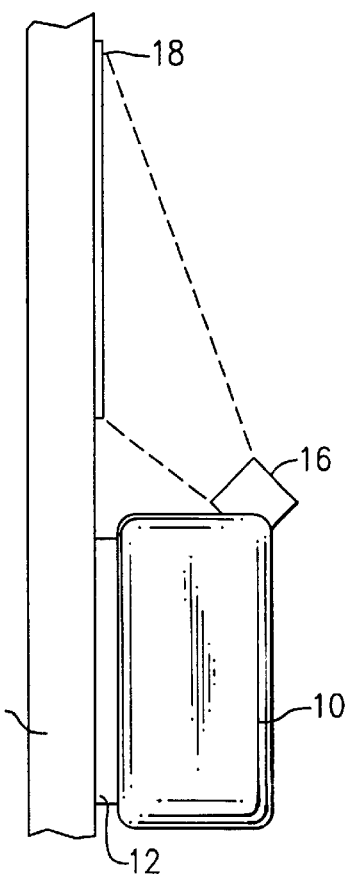
FIG. 1 is a side view of a thermostat having a projection device mounted to the top of the thermostat.
Figure 2:
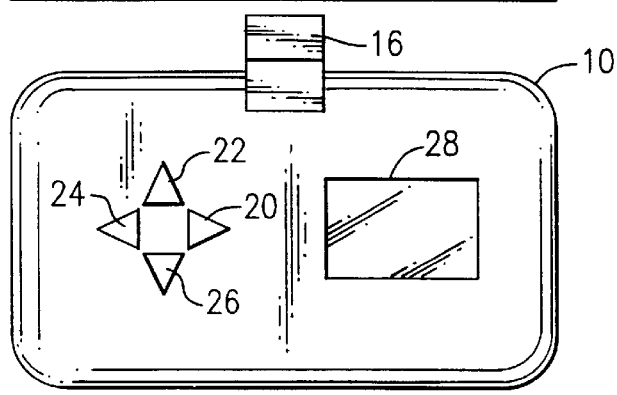
FIG. 2 is a front view of the thermostat of FIG. 1 illustrating the projection of an image above the thermostat.

Referring to FIG. 1, a programmable electronic thermostat 10 is seen to include a backend portion 12 that is normally attached to a wall 14. The thermostat 10 includes a projection device 16 preferably mounted to the top of the thermostat so as to project an image onto a screen 18 affixed to the wall 14 above the thermostat. It is however to be understood that the projection may be directly onto the wall 14 without the need for the screen 18. Referring to FIG. 2, the front side of the thermostat 10 is seen to include a set of four depressible keys, 20, 22, 24 and 26. While the number of such keys may vary, the preferred embodiment will preferably have four such depressible keys. The thermostat 10 may include a viewable display 28 on the front side of the thermostat. The display 28 is not however required and would merely be in addition to the projected display from the projection device 16. An image 30 projected by the device 16 appears above the thermostat 10. The exemplary display is of various set point temperatures occurring at identified times of the day. There is furthermore instructions provided as to how to manipulate the depressible keys so as to change the selected setpoint temperatures and associated times at the bottom of the display. In particular, the up/down keys 22 and 26 are used to scroll to a time or temperature that is to be changed whereas the keys 20 and 24 are to be used to increment a selected time or temperature either up or down.

Figure 3:
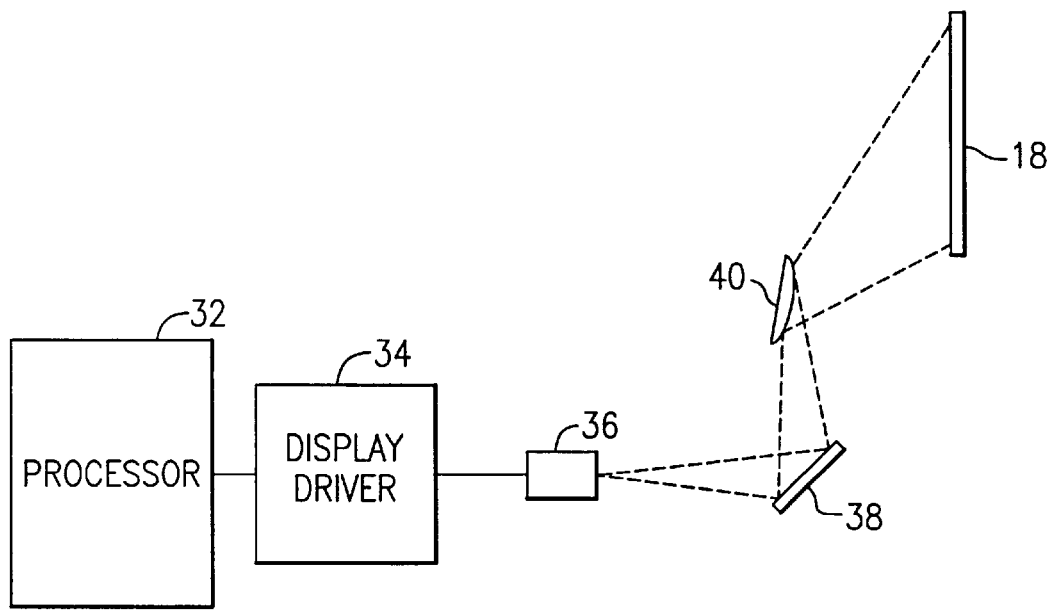
FIG. 3 illustrates a processor and associated display device for generating and image that is thereafter transferred by certain apparatus so as to produce the image of FIG. 2.

Referring to FIG. 3, the internal structure of the thermostat which produces the projected image 30 is illustrated. In particular, a processor 32 is connected to a display driver 34 which in turn is connected to a display device 36. The display device 36 in FIG. 3 is preferably a raster scanned laser light emitting diode device which produces a sufficiently illuminated image that can be directed onto a mirror 38. Such display devices are available in sizes constrained by the internal dimensions of a thermostat. It is however to be understood that other miniature display devices producing a sufficiently illuminated image may also be used. The mirror 38 projects the image onto an image enlargement device such as a convex-shaped mirror 40. The convex shaped mirror is preferably mounted within the projection device 16. The position of the convex shaped mirror is preferably adjustable so as to appropriately direct the image onto the screen 18 which may vary in location above the thermostat.

Figure 4:
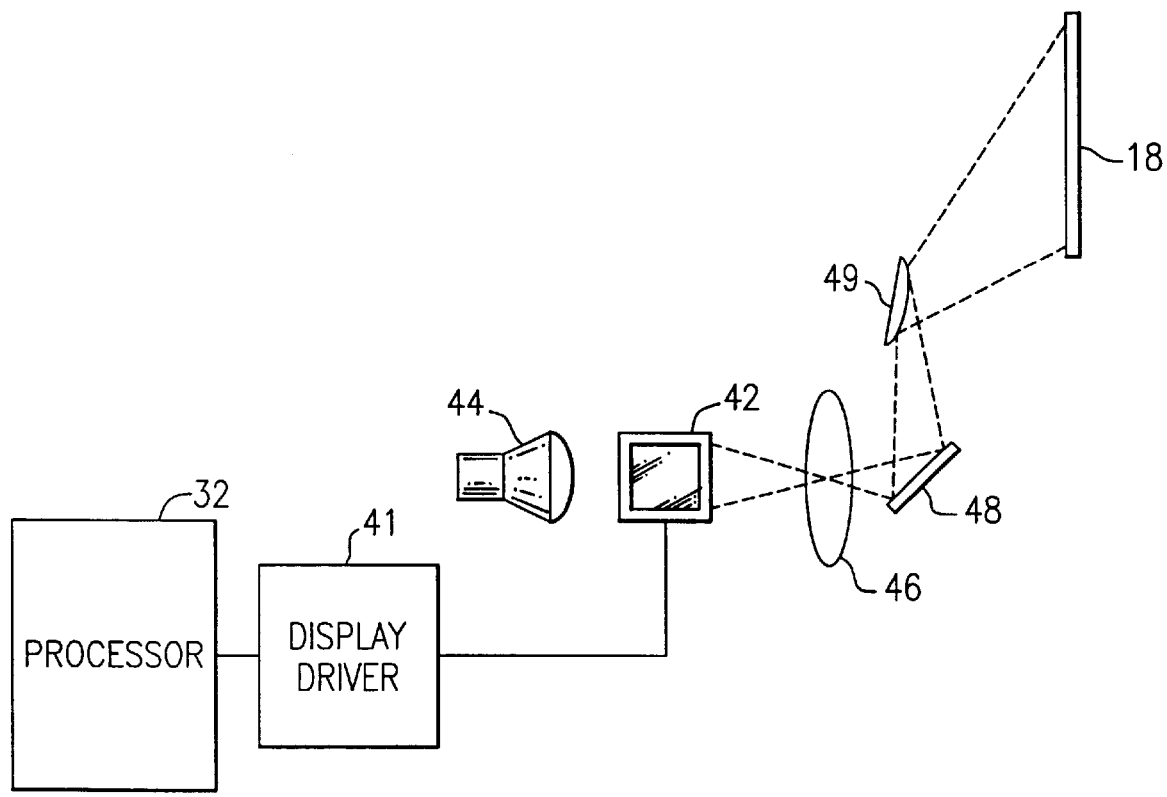
FIG. 4 illustrates a processor with an alternative image display device and alternative image transfer apparatus to that of FIG. 3.

Referring to FIG. 4, an alternative internal structure is shown for generating and thereafter projecting an image onto the screen 18. In particular, the processor 32 is connected to a display driver 41 which is in turn connected to a transparent liquid crystal display 42. A projection lamp 44 projects light through the image formed on the transparent liquid crystal display 42. The illuminated image is magnified by an inverting lens 46 before passing to a mirror 48 which redirects the image on to a convex-shaped mirror 49 and hence onto the screen 18. The convex shaped mirror 49 is preferably mounted within the projection device 16. The position of the convex shaped mirror is preferably adjustable so as to appropriately direct the image onto the screen 18 which may vary in location above the thermostat.

It is to be appreciated that FIGS. 3 and 4 merely show two possible image projection systems. Other types of miniature display devices in conjunction with other combinations of lenses and mirrors may be used to produce an appropriate image on the mirror 18.

Figure 5:
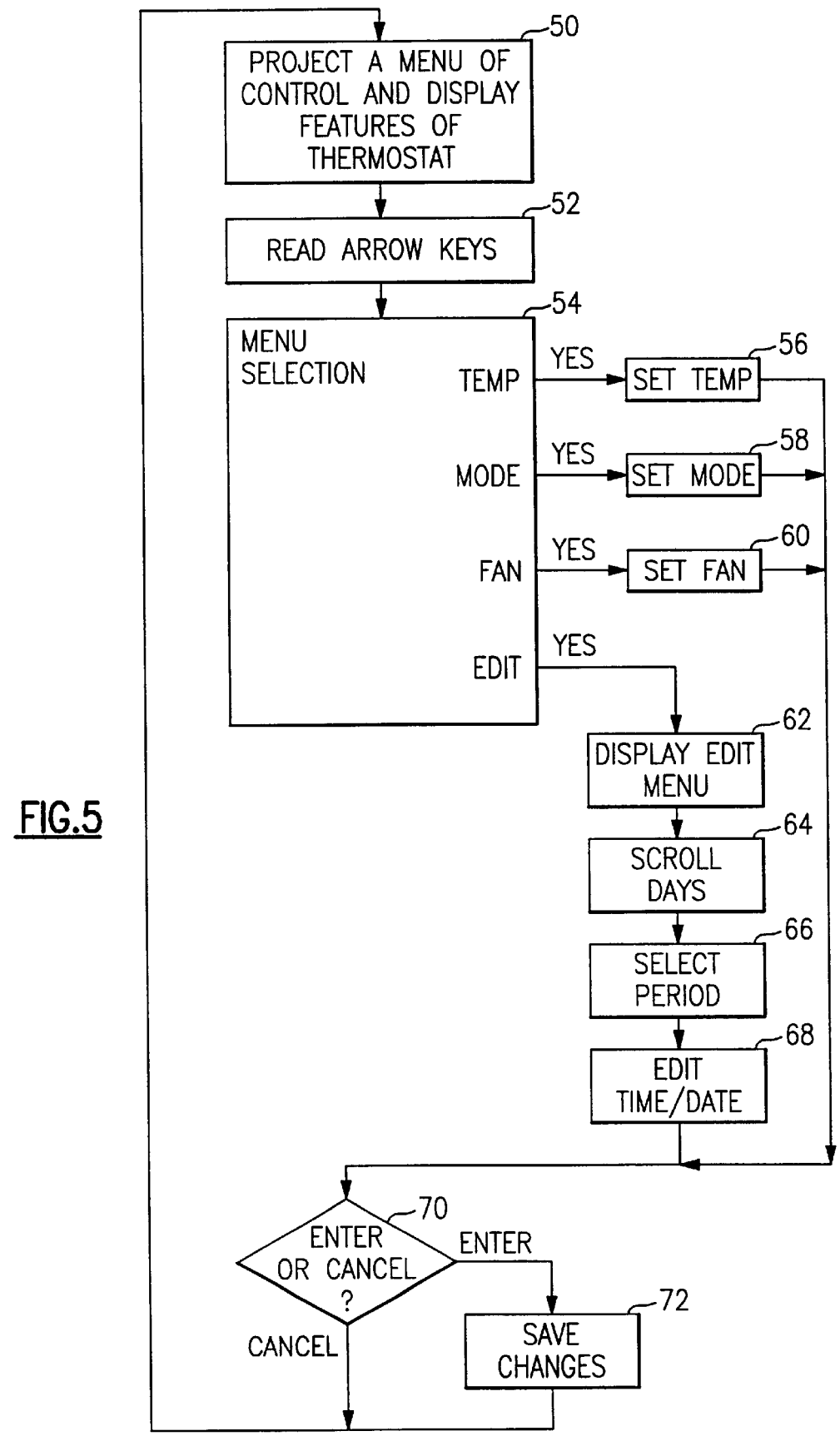
FIG. 5 is a schematic illustration of a program resident in the processor of FIGS. 3 and 4 which generates exemplary display images that are to be projected.

Referring now to FIG. 5, a process executable by the processor 32 so as to project particular images onto the screen 18 is shown. The process begins with a step 50 wherein a menu of control and display features of the thermostat 10 is provided to a display driver such as the display driver 34 in FIG. 3 or the display driver 41 in FIG.

4. The respective display drivers cause a predefined image of the menu to be formed on a display device, such as display device 36 in FIG. 3 or display device 42, in FIG. 4. The formed menu image is thereafter projected on to the screen 18. The thus projected menu preferably allows the viewer to make a selection between setting temperatures, setting modes of operation, setting the fan speed, or editing the schedule for any of the above features. The projected menu preferably includes instructions as to how to make a selection using the arrow keys.

The processor proceeds to a step 52 and reads the status of the arrow keys 20 through 26. The processor then proceeds to a step 54 and uses the read status of the arrow keys to determine which, if any, of the programmable features of the thermostat has been selected for display. The appropriate image for setting temperature, mode of operation, and fan speed is displayed in either step 56, 58 or 60. Any changes to the displayed images is noted by the processor through a check of the status of the arrow keys after a reasonable time has elapsed following the initial image display. If an edit feature has been selected, then the processor proceeds to call for an image of an editing menu in a step 62. The image could for instance be a programming schedule such as shown in FIG. 2. In the event an edit menu such as shown in FIG. 2 is selected, then the processor will proceed through steps 64, 66, and 68 so as to allow the user to scroll through, for instance, days of the week. The processor looks at the status of the arrow keys to determine whether the user has first selected a period during the day that is to be edited and to thereafter edit the time and date for that selected period pursuant to the status of the arrow keys. The processor then proceeds to a step 70 to inquire whether or not the particular displayed image is to be entered or cancelled. This latter determination is made by reading the status of normally one of the arrow keys that would signify what the user wished to do. In the event that an entry has been signaled by an appropriately depressed key, then the processor would proceed to step 72 and save any changes noted in editing the temperature setpoint schedule in steps 62 through 68 or any changes made to any of the other displayed images formed in steps 56, 58, or 60. This is done in step 72. It is to be noted that the processor proceeds from either step 70 or step 72 back to step 50 and again implements a projection of a menu of control and display features for the thermostat.

It is to be appreciated that preferred embodiments of a thermostat having an image projection capability have been disclosed. Alterations and modifications to the thus disclosed thermostat may occur without departing from the scope of the invention. In particular, the type of display device may vary as well as the arrangement of mirrors and lenses downstream of the display without departing from the scope of the invention. Moreover, the projection device 16 may either be totally within the body of the thermostat or it could be an affixed or foldout device relative to the thermostat.

Accordingly, the foregoing description of the invention is by way of example only, and the invention is to be limited by the following claims and equivalents thereto.

What is claimed is:

1. A thermostat having programmable features that may be selectively programmed by a person entering information concerning the programmable features into the thermostat, said thermostat comprising:

at least one depressible key for entering information into the thermostat concerning at least one programmable feature;

a processor within said thermostat, said processor being operative to generate at least one image relating to the programmable feature;

image projection apparatus for projecting the image generated by said processor onto a surface in the immediate vicinity of the thermostat whereby the person entering information concerning programmable features may view the projected image.

2. The thermostat of claim 1 wherein said thermostat is mounted to a wall and wherein said image projection apparatus includes a screen affixed to the wall in the vicinity of the thermostat so as to receive the projected image by said processor.

3. The thermostat of claim 1 wherein said image projection apparatus comprises:

a device for forming the image on a medium; and image redirecting means which redirects the image formed on the medium onto the surface in the immediate vicinity of the thermostat.

4. The thermostat of claim 3 wherein said image redirecting means includes an image enlarging means.

5. The thermostat of claim 4 wherein the orientation of said image enlarging means is adjustable so as to define where the image appears on the surface in the vicinity of the thermostat.

6. The thermostat of claim 4 wherein said image enlarging means is located in a housing that is mounted to the body of the thermostat.

7. The thermostat of claim 4 wherein said image enlarging means is a convex shaped mirror.

8. The thermostat of claim 4 wherein said image redirecting means includes at least one mirror located between said device for forming the image on the medium and said convex shaped mirror whereby the image formed on the medium is redirected onto the convex shaped mirror.

9. The thermostat of claim 1 wherein said image projection apparatus includes a device located on the top of the body of the thermostat for projecting the image generated by said processor onto the surface in the immediate vicinity of the thermostat.

10. The thermostat of claim 9 wherein said image projection apparatus includes a screen located above the thermostat so as to receive the image from said device located on the top of the thermostat.

11. The thermostat of claim 1 wherein said processor is programmed so as to generate menus of at least one of the programmable features of the thermostat in response to the activation of the one or more keys for entering information into the thermostat.

12. The thermostat of claim 11 wherein the menu of at least one of the programmable features includes instructions as to how to make menu selections using at least one depressible key for entering information into the thermostat concerning at least one programmable feature.

13. Projection apparatus for projecting information concerning the operation of a thermostat onto a surface in the vicinity of the thermostat, said apparatus comprising:

a processor located within the thermostat, said processor being operative to generate at least one image relating to the operation of the thermostat: and image projection means responsive to said processor so as to project an image relating to the operation of the thermostat generated by said processor onto the surface in the vicinity of the thermostat wherein said image projection means comprises:

a device for forming the image on a medium; and image redirecting means which redirects the image formed on the medium onto the surface in the immediate vicinity of the thermostat.

14. The projection apparatus of claim 13 wherein said thermostat is mounted to a wall and wherein said image projection means includes a screen affixed to the wall in the vicinity of the thermostat so as to receive the projected image relating to the operation of the thermostat generated by said processor.

15. The projection apparatus of claim 13 wherein said image redirecting means includes an image enlarging means.

16. The projection apparatus of claim 15 wherein the image enlarging means is a convex shaped mirror.

17. The projection apparatus of claim 16 wherein said image redirecting means includes at least one mirror located between said device for forming the image on the medium and said convex shaped mirror whereby the image formed on the medium is redirected onto the convex shaped mirror.

18. The projection apparatus of claim 13 wherein said image redirecting means includes a device located on the top of the thermostat for projecting the image formed on the medium onto the surface in the immediate vicinity of the thermostat.

19. The projection apparatus of claim 18 wherein said image projection means includes a screen located above the thermostat so as to receive the image from said device located on the top of the thermostat for projecting the image generated by said processor.

20. The thermostat of claim 13 wherein said processor is programmed so as of the programmable features as to the operation of the thermostat.

21. The thermostat of claim 20 wherein of at least one of the menus of programmable features includes instructions as to how to make menu selections using at least on the thermostat.

* * * * *